United States Patent
Rocznik

(10) Patent No.: US 8,210,038 B2
(45) Date of Patent: Jul. 3, 2012

(54) DRIVE FREQUENCY TUNABLE MEMS GYROSCOPE

(75) Inventor: Marko Rocznik, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 612 days.

(21) Appl. No.: 12/372,335

(22) Filed: Feb. 17, 2009

(65) Prior Publication Data

US 2010/0206071 A1 Aug. 19, 2010

(51) Int. Cl.
*G01C 19/56* (2012.01)
(52) U.S. Cl. .................................. 73/504.12; 73/504.14
(58) Field of Classification Search ............... 73/504.12, 73/504.14
See application file for complete search history.

(56) References Cited

U.S. PATENT DOCUMENTS

| | | | |
|---|---|---|---|
| 5,920,012 A | 7/1999 | Pinson | |
| 5,945,599 A * | 8/1999 | Fujiyoshi et al. | .......... 73/504.12 |
| 6,407,484 B1 | 6/2002 | Oliver et al. | |
| 6,858,970 B2 | 2/2005 | Malkin et al. | |
| 6,954,025 B2 | 10/2005 | Nishida et al. | |
| 6,978,673 B2 * | 12/2005 | Johnson et al. | ............ 73/504.12 |
| 7,057,330 B2 | 6/2006 | Buhler et al. | |
| 7,105,982 B1 | 9/2006 | Hagood, IV et al. | |
| 2004/0199347 A1 | 10/2004 | Painter et al. | |

OTHER PUBLICATIONS

International Search Report in corresponding PCT application (i.e., PCT/US2010/023695), mailed May 21, 2010 (3 pages).
Boudaoud et al., "Self-Adaptation in Vibrating Soap Films," Physical Review Letters, vol. 82, No. 19, pp. 3847-3850, May 10, 1999, (4 pages).
Boudaoud et al., "A self-adaptative oscillator," The European Physical Journal B, Eur. Phys. J. B 9, 159-165 (1999) (7 pages).

* cited by examiner

*Primary Examiner* — John Chapman, Jr.
(74) *Attorney, Agent, or Firm* — Maginot, Moore & Beck

(57) ABSTRACT

A drive frequency tunable MEMS sensor in one embodiment includes a mass, a mass drive component configured to drive the mass within a plane, a plurality of non-linear springs supporting the mass a first tuner operably connected to the plurality of non-linear springs for modifying the stress condition of the plurality of non-linear springs in response to a trim voltage, and a trim circuit electrically coupled with the first tuner for providing the trim voltage.

20 Claims, 4 Drawing Sheets

DRIVE FREQUENCY TUNABLE MEMS GYROSCOPE

BACKGROUND

This invention relates to semiconductor devices and particularly to devices incorporating sensor elements.

Background

In the past, micro-electromechanical systems (MEMS) have proven to be effective solutions in various applications due to the sensitivity, spatial and temporal resolutions, and lower power requirements exhibited by MEMS devices. Consequently, MEMS based sensors, such as accelerometers, gyroscopes and pressure sensors, have been developed for use in a wide variety of applications.

MEMS gyroscopes can be configured as rotating mass devices or as vibration devices, both of which rely upon the Coriolis effect to generate an angular change in the device that is measured by the sensor. Linearly oscillating devices have various advantages over devices which rely upon a rotating mass. In a linear device, a mass supported by springs, referred to as the Coriolis mass, is induced to a linear oscillatory movement. As the MEMS device is rotated, the Coriolis mass rotates with respect to a sense electrode. The out of plane rotation of the Coriolis mass thus changes a capacitance between the sense electrode and the Coriolis mass which provides an indication of the angular rate of rotation.

Because linear devices incorporate an oscillating mass, such devices exhibit a resonant drive frequency ($f_{dr}$). The $f_{dr}$ is a function of the various components of the sensor which affect the movement of the Coriolis mass in the drive plane. Accordingly, the $f_{dr}$ is a function of various mechanical springs which support the Coriolis mass as well as the component used to impart the oscillatory motion. Typically, oscillation of the Coriolis mass is effected by a comb finger device.

In comb finger drives, plates on the Coriolis mass are interlaced with plates on a base component. As voltage is applied to the base component plates, the Coriolis mass is displaced. The force of the comb finger drive on the Coriolis mass is relatively constant throughout the oscillatory movement of the mass. Accordingly, the effect of the comb finger drive on the $f_{dr}$ is negligible. Thus, the $f_{dr}$ of a linear MEMS gyroscope is primarily a function of the mechanical springs in the drive plane.

Because the Coriolis mass is oscillating as the mass rotates out of plane when the sensor is subjected to a rotation, the out of plane movement of the Coriolis mass which is detected by the sensor (detection movement) also exhibits a resonant frequency ($f_{det}$). The $f_{det}$ is a function of various mechanical springs which support the Coriolis mass through the out of plane rotation as well as the force exerted on the Coriolis mass by the detection component. As noted above, the detection component is typically an electrode which, with the Coriolis mass, forms a capacitor. The force of the electrode on the Coriolis mass, which has a spring constant with a sign opposite to the sign of the mechanical springs, is a function of the voltage applied to the electrode. The effect of the electrode on the Coriolis mass is not negligible.

Matching the $f_{dr}$ with the $f_{det}$ assists in optimizing the signal to noise ratio (SNR) of a MEMS sensor. Manufacturing processes, however, do not allow sufficient control over the various forces within the sensor device to provide the desired consistency between the resonant frequencies. Accordingly, because the effect of the detection electrode on the Coriolis mass can easily be modified by modifying the applied voltage, MEMS devices are typically fabricated with a mechanical component of the $f_{det}$ higher than the mechanical component of the $f_{dr}$. Subsequently, the electrical component of the $f_{det}$ can be modified to tune the $f_{det}$ to the $f_{dr}$.

Various approaches to tuning the $f_{det}$ using a trim or electrode voltage ($U_{DF}$) have been developed. In one approach, separate sense (detection) and trim electrodes are provided and a constant $U_{DF}$ is applied to the trim electrodes. Alternatively, a trim voltage may be applied as a time multiplexed signal to the same electrodes used to detect the out of plane movement of the Coriolis mass.

While the modification of the $f_{det}$ with the various known approaches is effective, the various approaches described above require the addition of voltage on the detection side of the device. Additional voltage on the detection side of the sensor increases the complexity of conditioning required on the output of the sensor to allow detection of the out of plane movement of the Coriolis mass. For example, applying a pulsed $U_{DF}$ results in additional noise. Additionally, because the application of $U_{DF}$ to an electrode positioned beneath the Coriolis mass results applies an attractive force to the Coriolis mass, the possibility of parasitic mechanical mode vibrations in the Coriolis mass is increased.

A sensor capable of sensing the out of plane movement of a Coriolis mass is useful. The ability to match the $f_{det}$ with the $f_{dr}$ of such a system would be useful. A device which allows matching of the $f_{det}$ with the $f_{dr}$ without applying additional voltage to the detection side of the device would be beneficial.

SUMMARY

In accordance with one embodiment, a drive frequency tunable MEMS sensor includes a mass, a mass drive component configured to drive the mass within a plane, a plurality of non-linear springs supporting the mass a first tuner operably connected to the plurality of non-linear springs for modifying the stress condition of the plurality of non-linear springs in response to a trim voltage, and a trim circuit electrically coupled with the first tuner for providing the trim voltage.

In accordance with another embodiment, a method of operating a micro-electromechanical systems (MEMS) device includes supporting a mass above a substrate with a plurality of non-linear springs, driving the mass within a plane, providing a trim voltage to a first tuner, and modifying the stress condition of the plurality of non-linear springs with the first tuner.

In yet another embodiment, a micro-electromechanical systems (MEMS) device includes a substrate, an electrode on the substrate, a mass positioned above the electrode, a plurality of non-linear springs supporting the mass above the electrode, a drive device configured to drive the mass along a plane in response to a drive signal, and at least one tuner physically connected to at least one of the plurality of non-linear springs for modifying the stress of the at least one of the plurality of non-linear springs responsive to a trim signal.

DESCRIPTION

Figure 1:
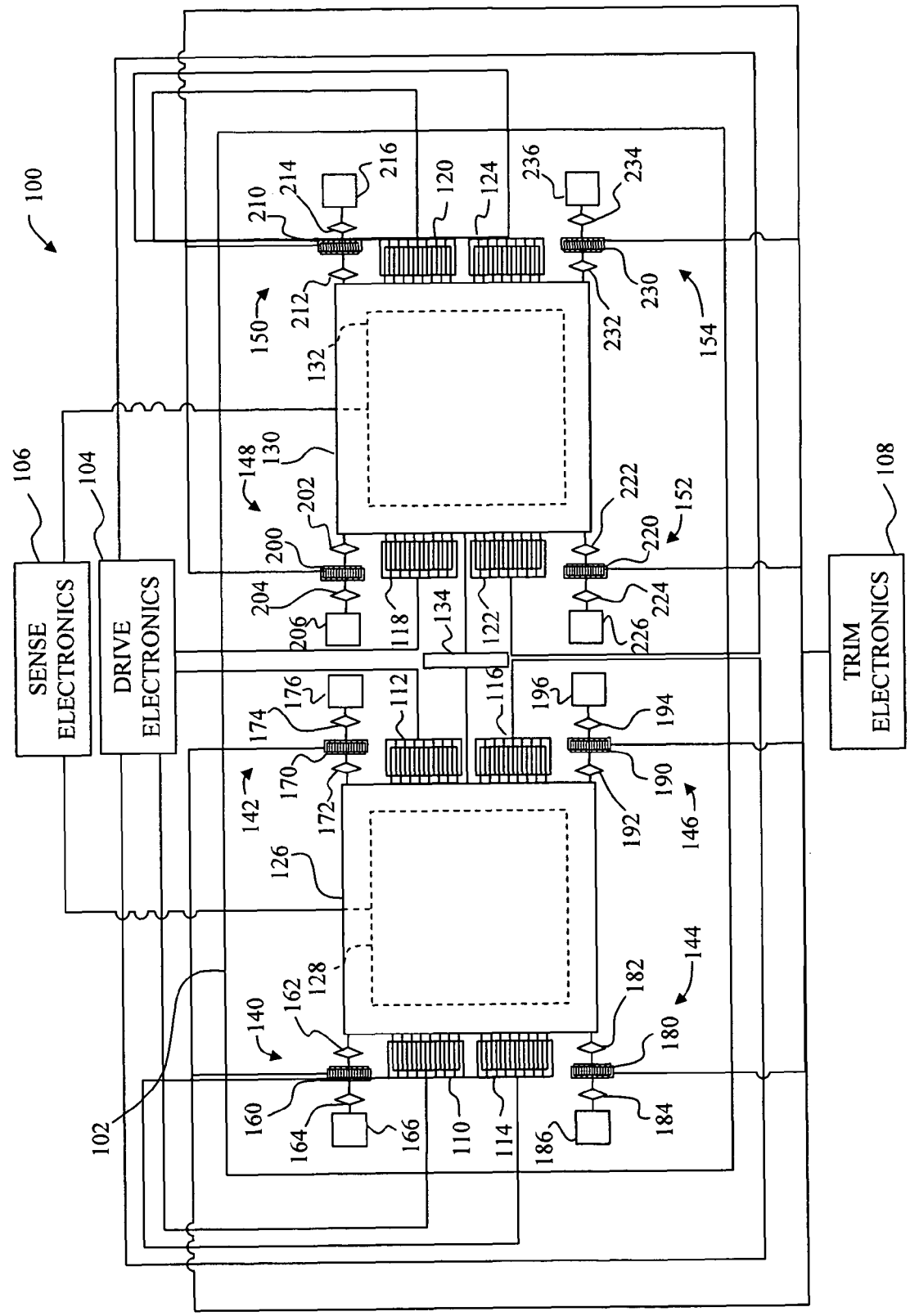
FIG. 1 depicts a top plan view of a MEMS sensor configured to tune the resonant drive frequency of a linearly oscillating Coriolis mass using tuners that include interleaved fingers positioned between springs used to support the Coriolis mass above a sense electrode.

A micro-electromechanical systems (MEMS) device 100 is depicted in FIG. 1. The device 100 includes a substrate 102, drive electronics circuit 104, sense electronics circuit 106, and trim electronics circuit 108. The drive electronics circuit 104 is connected to drive devices 110, 112, 114, 116, 118, 120, 122, and 124.

The drive devices 110, 112, 114, and 116 include comb fingers which are interleaved with comb fingers on a Coriolis mass 126 which is positioned above a sense electrode 128. The sense electrode 128 is connected to the sense electronics circuit 106. The drive devices 118, 120, 122, and 124 include comb fingers which are interleaved with comb fingers on a Coriolis mass 130 which is positioned above a sense electrode 132. The Coriolis mass 130 is connected to the mass 126 by a coupling spring 134 and the sense electrode 132 is connected to the sense electronics circuit 106.

Each corner of the mass 126 is supported by a respective tuner system 140, 142, 144, or 146 and each corner of the mass 130 is supported by a respective tuner system 148, 150, 152, or 154. The tuner system 140 includes a tuner 160 which is connected through a spring 162 to the mass 126. A spring 164 is located between the tuner 160 and an anchor 166. The anchor 166 is fixedly attached to the substrate 102 and to the spring 164 to support the mass 126.

Similarly, the tuner system 142 includes a tuner 170 which is connected through a spring 172 to the mass 126. A spring 174 is located between the tuner 170 and an anchor 176. The anchor 176 is fixedly attached to the substrate 102 and to the spring 174 to support the mass 126. Additionally, the tuner system 144 includes a tuner 180 which is connected through a spring 182 to the mass 126. A spring 184 is located between the tuner 180 and an anchor 186. The anchor 186 is fixedly attached to the substrate 102 and to the spring 184 to support the mass 126. Finally, the tuner system 146 includes a tuner 190 which is connected through a spring 192 to the mass 126. A spring 194 is located between the tuner 190 and an anchor 196. The anchor 196 is fixedly attached to the substrate 102 and to the spring 194 to support the mass 126.

The mass 130 is similarly supported above the electrode 132. Specifically, the tuner system 148 includes a tuner 200 which is connected through a spring 202 to the mass 130. A spring 204 is located between the tuner 200 and an anchor 206. The anchor 206 is fixedly attached to the substrate 102 and to the spring 204 to support the mass 130.

Similarly, the tuner system 150 includes a tuner 210 which is connected through a spring 212 to the mass 130. A spring 214 is located between the tuner 210 and an anchor 216. The anchor 216 is fixedly attached to the substrate 102 and to the spring 214 to support the mass 130. Additionally, the tuner system 152 includes a tuner 220 which is connected through a spring 222 to the mass 130. A spring 224 is located between the tuner 220 and an anchor 226. The anchor 226 is fixedly attached to the substrate 102 and to the spring 224 to support the mass 130. Finally, the tuner system 154 includes a tuner 230 which is connected through a spring 232 to the mass 130. A spring 234 is located between the tuner 230 and an anchor 236. The anchor 236 is fixedly attached to the substrate 102 and to the spring 234 to support the mass 130.

Figure 2:
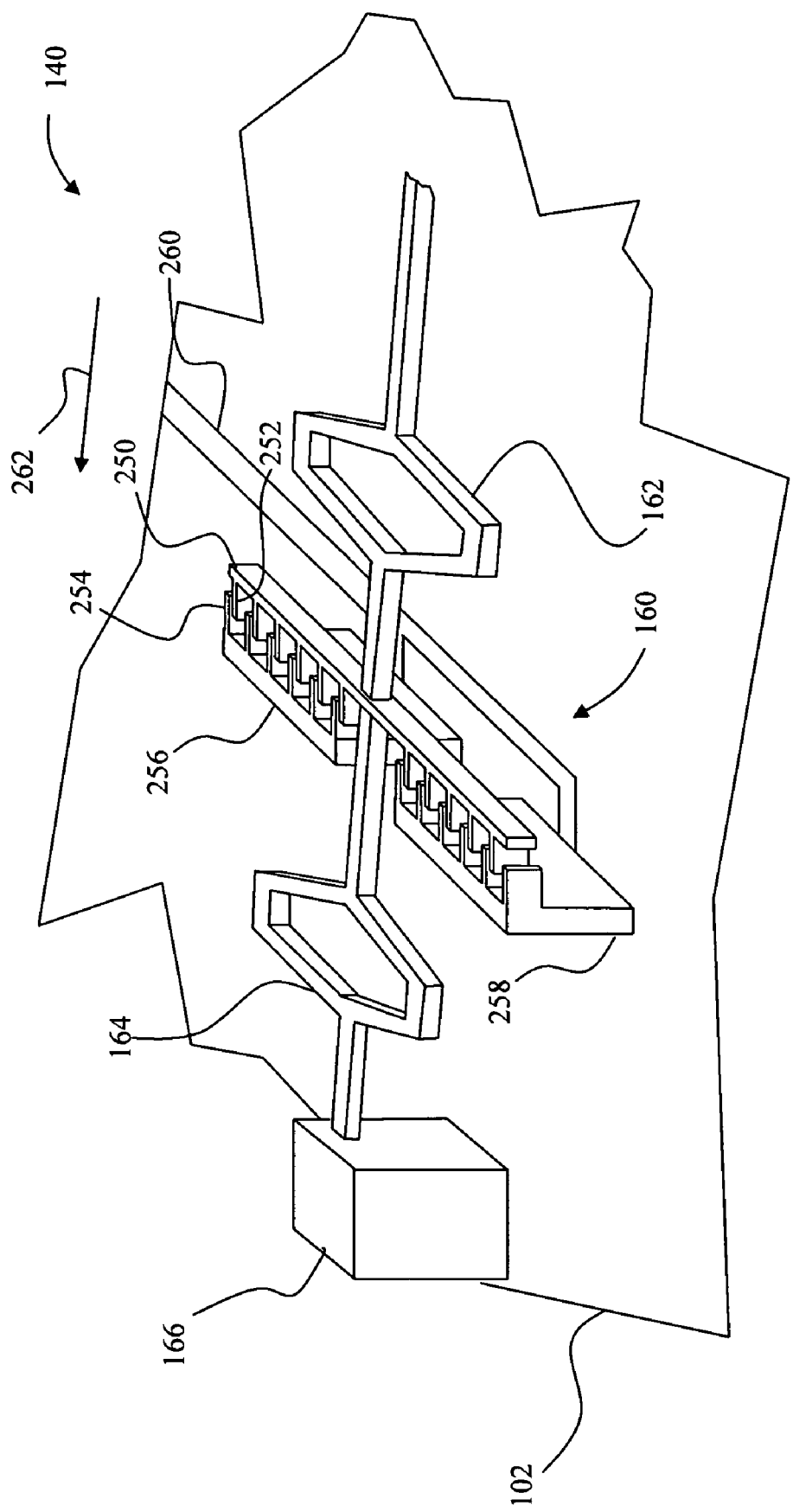
FIG. 2 depicts a partial perspective view of the device of FIG. 1 showing one of the tuner systems in the trim system including a tuner, two non-linear springs and an anchor.

FIG. 2 depicts a partial perspective view of the device 100 showing the tuner system 140. The spring 162 and the spring 164 in this embodiment are generally ovoid shaped springs. Other symmetrical spring forms may be used if desired. The springs 162 and 164 are connected to a floating portion 250 of the tuner 160. The floating portion 250 includes a number of comb fingers 252 which are interleaved with comb fingers 254 located on base portions 256 and 258 of the tuner 160. The base portions 256 and 258 are fixedly attached to the substrate 102. In this embodiment, the base portions 256 and 258 are made of a conductive material and are electrically coupled to the trim electronics circuit 108 by a trace 260. The trim electronics circuit 108 and the tuner systems 140, 142, 144, 146, 148, 150, 152, and 154 comprise the trim system for the device 100.

In operation, the drive electronics circuit 104 (FIG. 1) selectively applies a drive signal to the drive devices 110, 112, 114, 116, 118, 120, 122, and 124. In response the drive devices 110, 112, 114, and 116 drive the mass 126 into a linear oscillation toward and away from the mass 130. Additionally, the drive devices 118, 120, 122, and 124 drive the mass 130 into a linear oscillation toward and away from the mass 126. To a large extent, operation of the device 100 is similar to other gyroscope devices. The primary difference between other gyroscopes and the device 100 is the use of the trim system to modify the $f_{dr}$ of the device 100.

Specifically, the trim electronics circuit 108 provides a trim signal to the tuner systems 140, 142, 144, 146, 148, 150, 152, and 154. With reference to FIG. 2 and the tuner system 140, a trim voltage is supplied through the trace 260 to the base portions 256 and 258 of the tuner 160. The voltage is passed by the base portions 256 and 258 to the fingers 254, resulting in a force exerted on the fingers 252 of the floating portion 250. The exerted force causes the floating portion 250 to be biased in the direction of the arrow 262. Accordingly, the spring 164 is biased toward the anchor 166 placing the spring 164 into compression. Additionally, the spring 162 is biased away from the mass 126, placing the spring 162 in expansion.

Biasing of the spring 162 causes force from the tuner 160 to be transferred through the mass 126 to each of the other tuner systems 142, 144, and 146. Additionally, the tuner systems 148, 150, 152, and 154 are connected to the mass 126 through the mass 130 and the coupling spring 134. The mass 126 and the mass 130 are not affected positionally by the trim system, however, because the trim system forces are balanced. By way of example, the bias exerted on the mass 126 by the compression of the spring 162 is countered by an equal but opposite force exerted on the mass 126 by the spring 172 in the tuner system 142 as the spring 172 is placed into compression in a manner substantially identical to the foregoing description of the tuner system 140.

Accordingly, the tuner systems 140, 142, 144, 146, 148, 150, 152, and 154 are used to pre-stress the springs 162, 164, 172, 174, 182, 184, 192, 194, 202, 204, 212, 214, 222, 224, 232, and 236. The amount of pre-stress applied is selected to tune the $f_{dr}$ to the $f_{det}$. Modification of the $f_{dr}$ is enabled in the foregoing embodiment by selection of springs which exhibit a non-linear displacement per unit of applied force.

Figure 3:
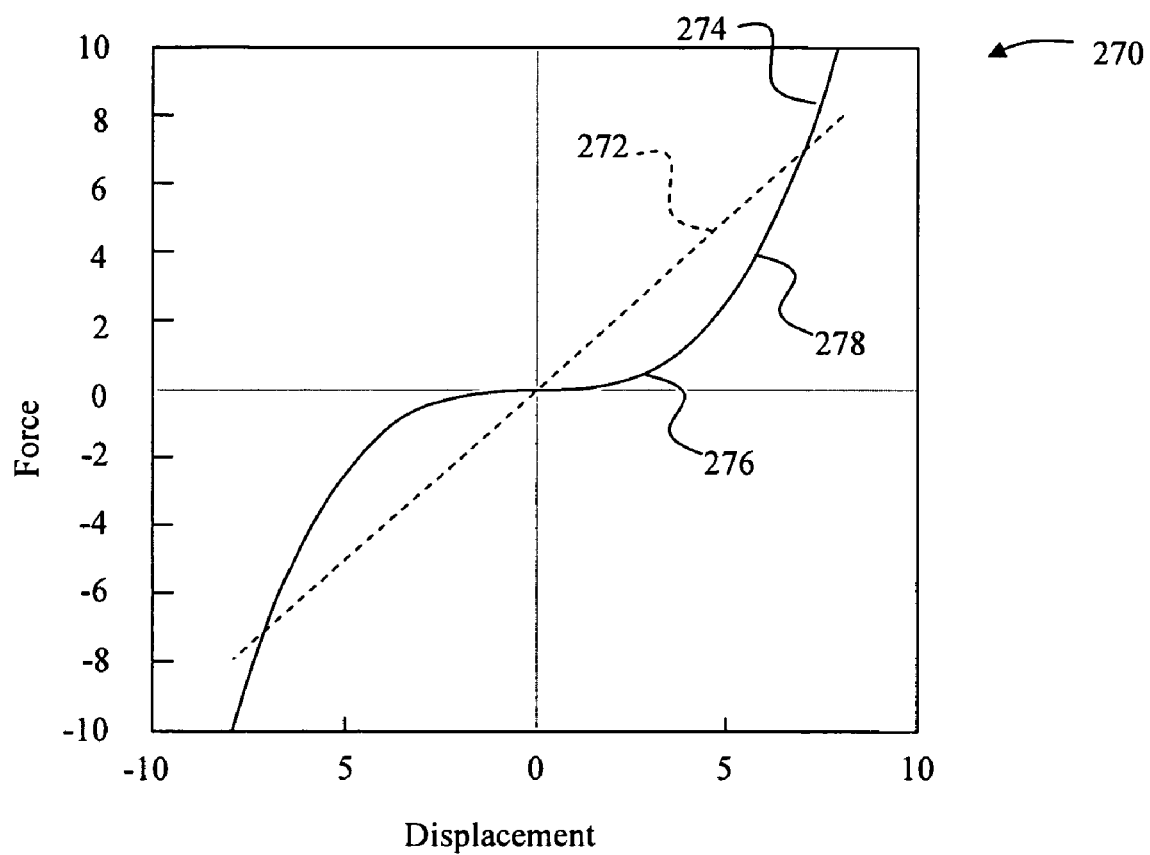
FIG. 3 depicts a force/displacement plot of a linear and non-linear spring.

By way of example, FIG. 3 depicts a plot 270 of the relationship between the amount of force applied to a selected spring and the resulting displacement of the selected spring. The line 272 depicts the force/displacement relationship of an exemplary linear spring. The spring constant for a given spring is related to the first derivative of the force/displacement curve for the spring. Thus, because the line 272 is linear, the spring constant for the linear spring does not change as the spring is stressed.

An exemplary non-linear spring, however, generates the force/displacement curve 274. Accordingly, the derivative of the curve 274 at the location 276 is relatively small while the derivative of the curve 274 at the location 278 is relatively large. Thus, the spring constant for a non-linear spring can be modified by controlling the pre-stress applied to the spring.

Therefore, by selecting and pre-stressing non-linear springs used to support a Coriolis mass above an electrode, the $f_{dr}$ of a device may be modified to match the $f_{det}$ of the device. If needed, additional tuning freedom may be provided by the inclusion of more than one tuner in a tuner system, each of the tuners separated from other tuners in the tuner system by a spring. The springs used to separate the tuners may be non-linear springs if desired.

Figure 4:
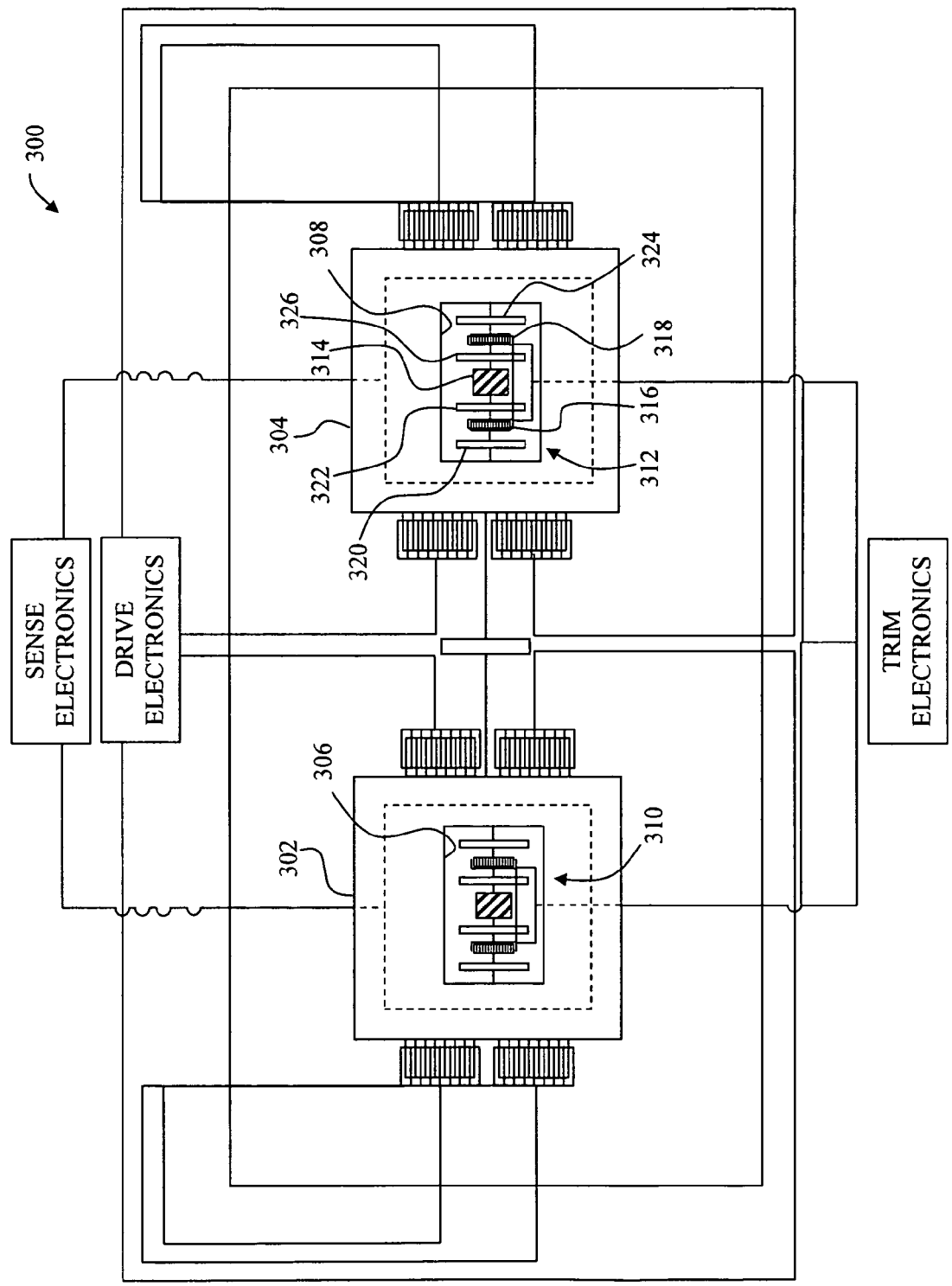
FIG. 4 depicts a top plan view of a MEMS sensor configured to tune the resonant drive frequency of a linearly oscillating Coriolis mass using tuners that include interleaved fingers positioned between springs positioned within an opening in the Coriolis mass.

If desired, the location of the tuning system may be modified. By way of example, FIG. 4 depicts a MEMS device 300 that is substantially similar to the MEMS device 100 of FIG. 1 with the exception of the tuning system placement. Specifically, in the MEMS device 300, each of the masses 302 and 304 include an opening 306 and 308, respectively. Within the openings 306 and 308 are located tuner systems 310 and 312. The tuner systems 310 and 312 are identical, are more fully described with reference to tuner system 312.

The tuner system 312 includes an anchor 314 and two tuners 316 and 318. Each of the tuners 316 and 318 are identical to the tuners 160, 170, 180, 190, 200, 210, 220 and 230. The tuner 316 is connected to one end of the opening 308 through a spring 320 and to the anchor 314 through a spring 322. The tuner 318 is connected to the end of the opening 308 opposite to the end connected to the spring 322 along the oscillation axis of the mass 304 through a spring 324, and to the anchor 314 through a spring 326.

Operation of the MEMS device 30 is similar to the operation of the MEMS device 100. The mass 302 and the mass 304 are not affected positionally by the trim system, however, because the tuner systems 310 and 312 are located on the oscillation axis of the masses 302 and 304. Thus, the trim system forces are balanced.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A sensor device comprising:
a mass;
a mass drive component configured to drive the mass within a plane along an oscillation axis;
a plurality of non-linear springs supporting the mass;
a first tuner operably connected to the plurality of non-linear springs and configured to modify the stress condition of the plurality of non-linear springs in response to a trim voltage by generating a force along the oscillation axis; and
a trim circuit electrically coupled with the first tuner for providing the trim voltage.

2. The device of claim 1, further comprising a first anchor attached to a substrate, wherein:
a first spring of the plurality of non-linear springs is attached to the first anchor and to a first portion of the first tuner;
a second spring of the plurality of non-linear springs is attached to the mass and to the first portion of the first tuner; and
a second portion of the tuner is fixedly attached to the substrate.

3. The device of claim 2, further comprising:
a second tuner with a first portion and a second portion, the second portion fixedly attached to the substrate;
a second anchor attached to the substrate;
a third spring of the plurality of non-linear springs attached to the second anchor and to the first portion of the second tuner; and
a fourth spring of the plurality of non-linear springs attached to the mass and to the first portion of the second tuner.

4. The device of claim 3, wherein:
the second spring is attached to a first end portion of the mass; and
the fourth spring is attached to a second end portion of the mass, the first end portion of the mass on a side opposite to the second end portion of the mass along the oscillation axis.

5. The device of claim 1, further comprising a first anchor attached to a substrate, wherein:
a first spring of the plurality of non-linear springs is attached to the first anchor and to a first portion of the first tuner;
a second spring of the plurality of non-linear springs is attached to the first portion of the first tuner and to a first portion of a second tuner; and
a third spring of the plurality of non-linear springs is attached to the mass and to the first portion of the second tuner.

6. The device of claim 1, the first tuner comprising:
a first plurality of fingers; and
a second plurality of fingers interlaced with the first plurality of fingers.

7. A method of operating a micro-electromechanical systems (MEMS) device comprising:
supporting a mass above a substrate with a plurality of non-linear springs;
driving the mass within a plane along an oscillation axis;
providing a trim voltage to a first tuner;
generating a force along the oscillation axis with the first tuner; and
modifying the stress condition of the plurality of non-linear springs with the first tuner.

8. The method of claim 7, further comprising:
biasing a first spring of the plurality of non-linear springs toward a first anchor with the first tuner; and
biasing a second spring of the plurality of non-linear springs away from the mass with the first tuner.

9. The method of claim 8, further comprising:
biasing a third spring of the plurality of non-linear springs toward a second anchor with a second tuner; and
biasing a fourth spring of the plurality of non-linear springs away from the mass with the second tuner.

10. The method of claim 9, wherein biasing the fourth spring away from the mass comprises:
biasing the fourth spring toward the second spring.

11. The method of claim 7, further comprising:
modifying the stress condition of the plurality of non-linear springs with a second tuner.

12. The method of claim 7, wherein modifying the stress condition of the plurality of non-linear springs comprises:
applying a voltage to a first plurality of fingers in the first tuner.

13. A micro-electromechanical systems (MEMS) device comprising:
- a substrate;
- an electrode on the substrate;
- a mass positioned above the electrode;
- a plurality of non-linear springs supporting the mass above the electrode;
- a drive device configured to drive the mass along an oscillation axis in a plane in response to a drive signal; and
- at least one tuner physically connected to at least one of the plurality of non-linear springs and configured to modify the stress of the at least one of the plurality of non-linear springs responsive to a trim signal by generating a force along the oscillation axis.

14. The MEMS device of claim 13, wherein:
the plurality of non-linear springs comprises a first spring supporting a first end portion of the mass and a second spring supporting a second end portion of the mass; and
the at least one tuner comprises a first tuner physically connected to the first spring and a second tuner physically connected to the second spring.

15. The MEMS device of claim 14, wherein:
the plurality of non-linear springs comprises a third spring supporting the first end portion of the mass and a fourth spring supporting the second end portion of the mass.

16. The MEMS device of claim 15, wherein:
the at least one tuner comprises a third tuner physically connected to the third spring and a fourth tuner physically connected to the fourth spring.

17. The MEMS device of claim 16, wherein:
the first spring supports a first corner portion of the mass;
the second spring supports a second corner portion of the mass;
the third spring supports a third corner portion of the mass; and
the fourth spring supports a fourth corner portion of the mass.

18. The MEMS device of claim 17, further comprising:
- a first anchor fixedly attached to the substrate and supporting the first spring;
- a second anchor fixedly attached to the substrate and supporting the second spring;
- a third anchor fixedly attached to the substrate and supporting the third spring; and
- a fourth anchor fixedly attached to the substrate and supporting the fourth spring.

19. The MEMS device of claim 13, wherein the first tuner comprises:
- a first plurality of fingers; and
- a second plurality of fingers interlaced with the first plurality of fingers.

20. A sensor device comprising:
- a mass;
- a mass drive component configured to drive the mass within a plane;
- an anchor attached to a substrate:
- a first non-linear spring attached to the anchor and to a first portion of a first tuner, the first tuner configured to modify the stress condition of the first non-linear spring in response to a first trim voltage;
- a second non-linear spring attached to the first portion of the first tuner and to a first portion of a second tuner, the second tuner configured to modify the stress condition of the second non-linear spring in response to a second trim voltage;
- a third spring attached to the mass and to the first portion of the second tuner; and
- a trim circuit electrically coupled with the first tuner for providing the first trim voltage, and with the second tuner for providing the second trim voltage.

* * * * *